United States Patent
Ko

(10) Patent No.: US 12,054,648 B2
(45) Date of Patent: Aug. 6, 2024

(54) ADHESIVE COMPOSITION

(71) Applicant: LG Chem, Ltd., Seoul (KR)

(72) Inventor: Min Jin Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 736 days.

(21) Appl. No.: 17/262,508

(22) PCT Filed: Jul. 25, 2019

(86) PCT No.: PCT/KR2019/009236
§ 371 (c)(1),
(2) Date: Jan. 22, 2021

(87) PCT Pub. No.: WO2020/022801
PCT Pub. Date: Jan. 30, 2020

(65) Prior Publication Data
US 2021/0284883 A1  Sep. 16, 2021

(30) Foreign Application Priority Data
Jul. 25, 2018  (KR) .................. 10-2018-0086344

(51) Int. Cl.
*C09J 163/00* (2006.01)
*C09J 7/38* (2018.01)

(52) U.S. Cl.
CPC .............. *C09J 163/00* (2013.01); *C09J 7/38* (2018.01); *C09J 2409/00* (2013.01); *C09J 2433/00* (2013.01); *C09J 2463/00* (2013.01); *C09J 2475/00* (2013.01)

(58) Field of Classification Search
None
See application file for complete search history.

(56) References Cited

U.S. PATENT DOCUMENTS

| | | | |
|---|---|---|---|
| 3,773,703 A | 11/1973 | Smeal | |
| 4,778,851 A * | 10/1988 | Henton | C08L 51/04 525/902 |
| 5,084,532 A | 1/1992 | Schenkel | |
| 5,278,257 A * | 1/1994 | Mulhaupt | C09J 175/00 525/445 |
| 6,015,865 A | 1/2000 | Blank et al. | |
| 6,894,113 B2 * | 5/2005 | Court | C08L 53/00 525/88 |
| 2003/0192643 A1 | 10/2003 | Schoenfeld et al. | |
| 2004/0077784 A1 | 4/2004 | Ilenda et al. | |
| 2005/0070634 A1 | 3/2005 | Lutz et al. | |
| 2008/0188609 A1 | 8/2008 | Agarwal et al. | |
| 2008/0200589 A1 | 8/2008 | Hubschmid | |
| 2008/0251203 A1 | 10/2008 | Lutz et al. | |
| 2008/0319105 A1 | 12/2008 | Lutz et al. | |
| 2009/0264558 A1 | 10/2009 | Kramer et al. | |
| 2009/0294057 A1 | 12/2009 | Liang et al. | |
| 2010/0130655 A1 | 5/2010 | Agarwal et al. | |
| 2011/0048637 A1 | 3/2011 | Kohli | |
| 2011/0126981 A1 | 6/2011 | Lutz et al. | |
| 2012/0071584 A1 | 3/2012 | Lutz et al. | |
| 2012/0211161 A1 | 8/2012 | Lutz et al. | |
| 2014/0275423 A1 | 9/2014 | Lutz et al. | |
| 2015/0001281 A1 | 1/2015 | Jialanella et al. | |
| 2015/0045510 A1 | 2/2015 | Braendli et al. | |
| 2015/0291835 A1 | 10/2015 | Liu et al. | |
| 2016/0017192 A1 | 1/2016 | Lutz et al. | |
| 2016/0122539 A1 | 5/2016 | Okamoto et al. | |
| 2016/0251510 A1 | 9/2016 | Furukawa et al. | |
| 2016/0272750 A1 | 9/2016 | Voci et al. | |
| 2017/0321094 A1 | 11/2017 | Holtgrewe et al. | |
| 2017/0349795 A1 | 12/2017 | Balijepalli et al. | |
| 2018/0094176 A1 | 4/2018 | Okamoto et al. | |
| 2020/0140722 A1 | 5/2020 | Hackett et al. | |
| 2021/0238462 A1 | 8/2021 | Ko et al. | |
| 2021/0269686 A1 | 9/2021 | Ko | |
| 2021/0269689 A1 | 9/2021 | Ko et al. | |
| 2021/0284882 A1 | 9/2021 | Ko et al. | |
| 2021/0284883 A1 | 9/2021 | Ko | |
| 2021/0284885 A1 | 9/2021 | Ko et al. | |

FOREIGN PATENT DOCUMENTS

| | | |
|---|---|---|
| CN | 1772810 A | 5/2006 |
| CN | 101517029 A | 8/2009 |
| CN | 101528796 A | 9/2009 |
| CN | 101679579 A | 3/2010 |
| CN | 101821333 A | 9/2010 |
| CN | 102648262 A | 8/2012 |
| CN | 102911631 A | 2/2013 |
| CN | 105612215 A | 5/2016 |
| CN | 106543941 A | 3/2017 |
| CN | 107428913 A | 12/2017 |
| CN | 109593323 A | 4/2019 |
| EP | 2163579 A2 | 3/2010 |

(Continued)

OTHER PUBLICATIONS

Search report from International Application No. PCT/KR2019/009236, mailed Oct. 25, 2019.
Extended European Search Report for Application No. 19840736.3, dated Aug. 9, 2021, 7 pages.
Search Report dated May 19, 2022 from the Office Action for Chinese Application No. 201980049075.x issued May 25, 2022, pp. 1-3.
International Search Report for Application No. PCT/KR2019/009229, dated Oct. 25, 2019, 3 pages.
Extended European Search Report for Application No. 19840034.3 dated Jun. 9, 2021. 7 pgs.
Search Report dated Jun. 10, 2022 from Office Action for Chinese Application No. 201980049078.3 issued Jun. 15, 2022. 3 pgs.
Author Unknown, Huntsman Product Bulletin "Advanced Materials Hypox RA1340", Aug. 2020, pp. 1-2, obtained from https://www.huntsman.com/docs/Documents/HYPOX-RA1340_eur_e.pdf.
Search report from International Application No. PCT/KR2019/009230, mailed Oct. 25, 2019.

(Continued)

*Primary Examiner* — Robert T Butcher
(74) *Attorney, Agent, or Firm* — Lerner David LLP

(57) ABSTRACT

An epoxy-based adhesive composition and the methods of manufacturing the same are provided. The adhesive composition provides excellent adhesion strength, peel strength and impact-resistant strength uniformly over a wide temperature range.

18 Claims, 1 Drawing Sheet

(56) References Cited

FOREIGN PATENT DOCUMENTS

| | | |
|---|---|---|
| EP | 2137277 B1 | 5/2011 |
| EP | 3006478 A1 | 4/2016 |
| EP | 3056540 A1 | 8/2016 |
| EP | 3225673 A1 | 10/2017 |
| EP | 3281965 A1 | 2/2018 |
| JP | S64090233 A | 4/1989 |
| JP | H02117948 A | 5/1990 |
| JP | H05065391 A | 3/1993 |
| JP | H05214310 A | 8/1993 |
| JP | H08109362 A | 4/1996 |
| JP | 2004176045 A | 6/2004 |
| JP | 2009501258 A | 1/2009 |
| JP | 2009506169 A | 2/2009 |
| JP | 2009545656 A | 12/2009 |
| JP | 2010507706 A | 3/2010 |
| JP | 2010077305 A | 4/2010 |
| JP | 2010530472 A | 9/2010 |
| JP | 2011530648 A | 12/2011 |
| JP | 2012136590 A | 7/2012 |
| JP | 2013503249 A | 1/2013 |
| JP | 5647199 B2 | 12/2014 |
| JP | 2015514149 A | 5/2015 |
| JP | 2015108077 A | 6/2015 |
| JP | 2015537081 A | 12/2015 |
| JP | 2017132953 A | 8/2017 |
| JP | 2018506635 A | 3/2018 |
| JP | 2018090651 A | 6/2018 |
| JP | 6694425 B2 | 5/2020 |
| KR | 20080046194 A | 5/2008 |
| KR | 20100049545 A | 5/2010 |
| KR | 20100059818 A | 6/2010 |
| KR | 20100067560 A | 6/2010 |
| KR | 20120104516 A | 9/2012 |
| KR | 101467609 B1 | 12/2014 |
| KR | 20140138760 A | 12/2014 |
| KR | 101798680 B1 | 11/2017 |
| WO | 2007025007 A1 | 3/2007 |
| WO | 2008049857 A1 | 5/2008 |
| WO | 2014072515 A1 | 5/2014 |
| WO | 2014196607 A1 | 12/2014 |
| WO | 2015053289 A1 | 4/2015 |
| WO | 2016102329 A1 | 6/2016 |
| WO | 2016163491 A1 | 10/2016 |

OTHER PUBLICATIONS

Extended European Search Report for Application No. 19840220.8, dated Jun. 15, 2021, 7 pages.
Search report from International Application No. PCT/KR2019/009233, mailed Oct. 24, 2019.
Extended European Search Report including Written Opinion for EP19841015 issued Jun. 9, 2021; 7 pages.
Adeka Corporation, "Epoxy resin—Product List," Functional Chemicals, Feb. 25, 2022 search, 3 pages. <URL: https://adeka-chemical.meclib.jp/adeka_epoxy_JPN/book/#target/page_no=9.
Search Report dated Apr. 20, 2022 from Office Action for Chinese Application No. 201980048324.3 issued Apr. 25, 2022. 3 pgs.
International Search Report for Application No. PCT/KR2019/009232, mailed Oct. 24, 2019, pp. 1-2.
Extended European Search Report for Application No. EP 19841786.7, dated Aug. 4, 2021, 6 pages.
Search Report dated Apr. 30, 2022 from the Office Action for Chinese Application No. 201980049081.5 issued May 9, 2022, pp. 1-3.
International Search Report for Application No. PCT/KR2019/009235, mailed Oct. 25, 2019, pp. 1-2.
Extended European Search Report Application No. EP 19840550.8, Dated Aug. 4, 2021, 7 pages.
Search Report dated May 19, 2022 from the Office Action for Chinese Application No. 201980049049.7 issued May 25, 2022, pp. 1-3.
Search report from International Application No. PCT/KR2019/009234, mailed Oct. 25, 2019.
Extended European Search Report and Written Opinion for EP Application No. 19840221.6 dated Aug. 10, 2021, 7 pgs.
Search Report dated May 8, 2022 from Office Action for Chinese Application No. 201980049181 issued May 12, 2022. 3 p. (see p. 2, categorizing the cited references).

* cited by examiner

[Figure 1]
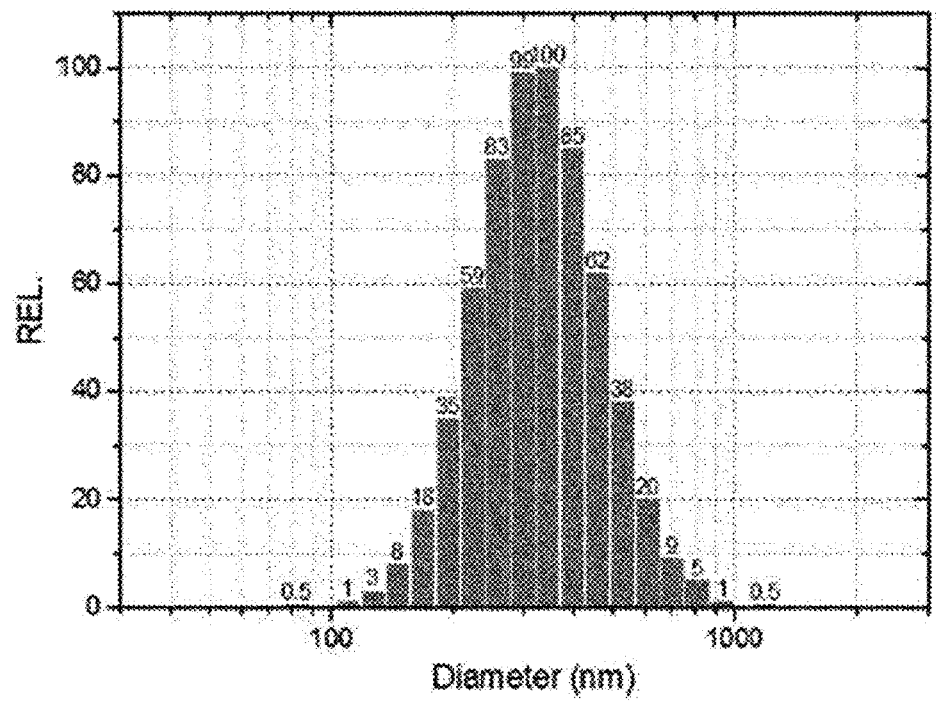
[Figure 2]
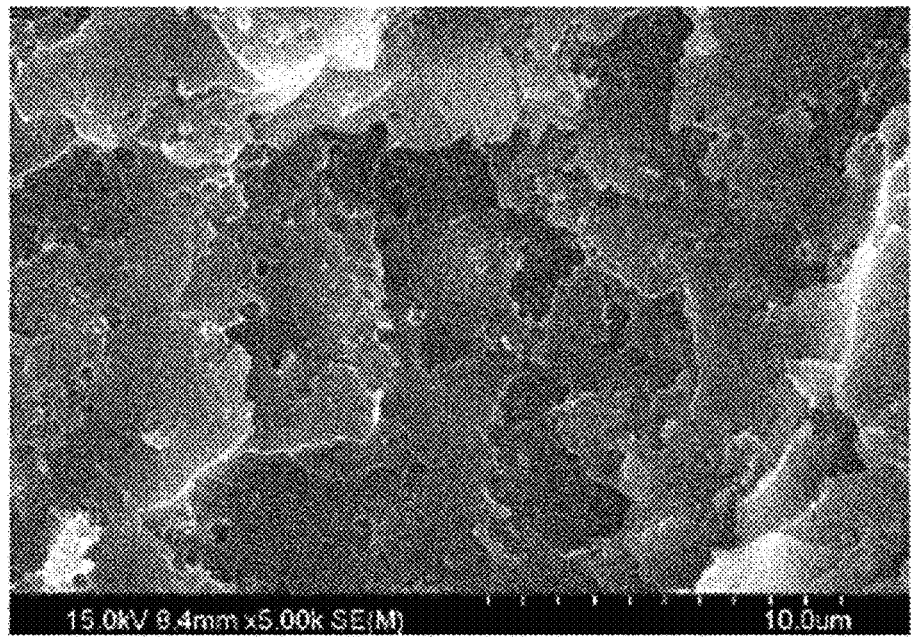

ADHESIVE COMPOSITION

CROSS-REFERENCE TO RELATED APPLICATIONS

The present application is a national phase entry under 35 U.S.C. § 371 of International Application No. PCT/KR2019/009236 filed Jul. 25, 2019, published in English, which claims priority from Korean Patent Application No. 10-2018-0086344 filed on Jul. 25, 2018, all of which are incorporated herein by reference.

TECHNICAL FIELD

The present application relates to an adhesive composition.

BACKGROUND ART

Adhesives comprising epoxy resins, that is, epoxy resin-based adhesives, have high heat resistance and excellent adhesion strength and thus are used to bond or join various kinds of base materials. For example, recently, the epoxy resin-based adhesives have been used for metal-metal joining or metal-plastic joining, and the like. In particular, when the epoxy resin-based adhesives are used in the automotive industry, there is an advantage that the cost can be reduced and the weight of the vehicle body can be reduced by reducing the number of welds required for manufacturing vehicle body frames. As a result, there is a growing expectation for application of epoxy resin adhesives in aerospace or wind power generation.

In consideration of accidents such as collisions, the epoxy resin-based adhesives used for automobiles require not only excellent adhesion strength but also impact-resistant strength. Then, these characteristics should be maintained uniformly over a wide range of temperatures in which automobiles are actually used, for example about −40 to 80° C. However, the epoxy resin-based adhesives according to the prior art have a problem that they do not provide sufficient strength for low temperature conditions such as −40° C.

DISCLOSURE

Technical Problem

It is one object of the present application to provide an epoxy resin-based adhesive composition.

It is another object of the present application to provide an adhesive composition that provides excellent adhesion strength, impact strength and shear strength over a wide temperature range.

The above objects and other objects of the present application can all be solved by the present application described in detail below.

Technical Solution

In one example of the present application, the present application relates to an adhesive composition comprising an epoxy-based resin. The adhesive composition may be used to bond homogeneous or heterogeneous base materials after curing. For example, the base material may comprise a metal component or a plastic component, whereby the adhesive composition may be used for metal-metal joining, metal-plastic joining or plastic-plastic joining, and the like. A joining body (hereinafter, may be referred to as a composite or a structure) of such a base material can be used, for example, as a component of an automobile or the like.

In the present application, the adhesive composition may comprise a) one or more epoxy resins, (b) acrylic cross-linked particles containing an alkyl (meth)acrylate unit and a unit of a monomer having an alkylene oxide group, (c) a core-shell rubber in the form of secondary particles in which two or more core-shell rubbers in the form of primary particles are aggregated, (d) one or more epoxy curing agents and (e) a urethane resin having a polyether structure. The adhesive composition of the present application comprising all of these configurations can provide excellent adhesion strength, impact-resistant strength and shear strength uniformly for a structure formed using the cured product of the adhesive composition from a low temperature such as −40° C. to a high temperature such as 80° C.

(a) Epoxy Resin

When all the (a) to (e) configurations are included, the specific structure of the epoxy resin used for the adhesive composition of the present application is not particularly limited. For example, the epoxy resin may be an epoxy resin having a saturated or unsaturated group, and may be an epoxy resin containing a cyclic structure or an acyclic structure. In addition, the specific kind of the epoxy resin used in the present application is not particularly limited either. For example, the epoxy resin may include a bisphenol-based epoxy resin such as bisphenol A series or bisphenol F series; a novolac-based epoxy resin; or an oxazolidone-containing epoxy resin, and the like.

In one example, the epoxy resin may include one or more selected from a bisphenol A-based epoxy resin and a bisphenol F-based epoxy resin. For example, the trade name YD-128, YDF-170 or YD-011 from Kukdo Chemical, and the like can be used.

In one example, the epoxy resin (a) may include an epoxy resin having an epoxy equivalent of less than 300. Specifically, the equivalent upper limit of the epoxy resin having an epoxy equivalent of less than 300 may be, for example, 280 or less, 260 or less, 240 or less, 220 or less, or 200 or less. Although not particularly limited, the equivalent lower limit of the epoxy resin having an epoxy equivalent of less than 300 may be, for example, 100 or more, 110 or more, 120 or more, 130 or more, 140 or more, or 150 or more. If the equivalent range is satisfied, the specific structure or type of the epoxy resin having an epoxy equivalent of less than 300 is not particularly limited.

In one example, the adhesive composition may comprise two or more epoxy resins that one or more features selected from an epoxy equivalent, a molecular weight or a viscosity are different from each other.

In one example, the adhesive composition may comprise two or more epoxy resins having different epoxy equivalents from each other. The epoxy equivalents of the two or more epoxy resins may be, for example, in a range of 120 to 700, and they may have equivalents different from each other. That is, the adhesive may comprise an epoxy resin mixture (a) in which two or more resins having different equivalents from each other are mixed.

In one example, the epoxy resin mixture (a) may further comprise one or more epoxy resins having an epoxy equivalent of 300 or more. For example, the epoxy equivalent of the epoxy resin may be 320 or more, 340 or more, 360 or more, 380 or more, 400 or more, 420 or more, 440 or more, 460 or more, 480 or more, 500 or more, 520 or more, 540 or more, 560 or more, 580 or more, or 600 or more. Although not particularly limited, the epoxy equivalent upper limit of the resin may be 650 or less, 640 or less, 630 or less, or 620 or less.

In one example, the adhesive composition may comprise a bisphenol A-based epoxy resin as the epoxy resin having an epoxy equivalent of less than 300. The specific structure of the used epoxy resin is not particularly limited as long as the equivalent is satisfied.

In another example, the adhesive composition may comprise a bisphenol A-based epoxy resin as the epoxy resin having an epoxy equivalent of 300 or more. The specific structure of the used epoxy resin is not particularly limited as long as the equivalent is satisfied.

In one example, the adhesive composition may comprise a bisphenol F-based resin as the epoxy resin having an epoxy equivalent of less than 300. The specific structure of the used epoxy resin is not particularly limited as long as the equivalent is satisfied.

In another example, the adhesive composition may further comprise a bisphenol F-based resin as the epoxy resin having an epoxy equivalent of 300 or more. The specific structure of the used epoxy resin is not particularly limited as long as the equivalent is satisfied.

In one example, the adhesive composition may comprise both of the bisphenol A-based resin and F-based resin satisfying the equivalent range.

When the epoxy equivalent increases, the crosslinking density may generally decrease while the viscosity increases, and the strength observed after the composition has cured may also be somewhat poor. In addition, when the epoxy equivalent decreases, there is a problem that cannot fully expect the effect of using the epoxy-based adhesive. However, when the resins having a predetermined epoxy equivalent as above are mixed and used, there is an advantage that can solve the above problems.

In one example, the adhesive composition may comprise an epoxy resin having an epoxy equivalent of less than 300 in an amount of 15 parts by weight or more relative to the total content of the adhesive composition. For example, the content of the epoxy resin having an epoxy equivalent of less than 300 may be 20 parts by weight or more, 25 parts by weight or more, 30 parts by weight or more, 35 parts by weight or more, 40 parts by weight or more, 45 parts by weight or more, or 50 parts by weight or more. In addition, although not particularly limited, the content upper limit of the epoxy resin having an epoxy equivalent of less than 300 may be, for example, 65 parts by weight or less, or 60 parts by weight or less.

In one example, the adhesive composition may comprise an epoxy resin having an epoxy equivalent of 300 or more in an amount of 1 part by weight relative to the total content of the adhesive composition. Specifically, the content of the epoxy resin having an epoxy equivalent of 300 or more may be 2 parts by weight or more, 3 parts by weight or more, 4 parts by weight or more, 5 parts by weight or more, 6 parts by weight or more, 7 parts by weight or more, 8 parts by weight or more, 9 parts by weight or more, or 10 parts by weight or more. In addition, although not particularly limited, the content upper limit of the epoxy resin having an epoxy equivalent of 300 or more may be, for example, 15 parts by weight or less, or 10 parts by weight or less.

In one example, the epoxy resin or the epoxy resin mixture may be used in an amount of 15 parts by weight or more, 20 parts by weight or more, 25 parts by weight or more, 30 parts by weight or more, 35 parts by weight or more, or 40 parts by weight or more, relative to the total content of the adhesive composition. The upper limit thereof is not particularly limited, but may be, for example, 80 parts by weight or less, 75 parts by weight or less, 70 parts by weight or less, 65 parts by weight or less, 60 parts by weight or less, 55 parts by weight or less, or 50 parts by weight or less.

In the present application, the adhesive composition may comprise a mono epoxy resin. In the present application, the mono epoxy resin may mean a component having one epoxy functional group in the molecule. The mono epoxy resin is capable of lowering the viscosity of the adhesive, and is advantageous in improving wettability, impact characteristics or adhesion (peeling) characteristics by adjusting the crosslinking density.

In another example, the mono epoxy resin may be used in an amount of 10 parts by weight or less relative to the total content of the adhesive composition. Specifically, the content of the mono epoxy resin may be, for example, 9 parts by weight or less, 8 parts by weight or less, 7 parts by weight or less, 6 parts by weight or less, or 5 parts by weight or less. The lower limit is not particularly limited, but may be, for example, 0.5 parts by weight or more.

(b) Acrylic Crosslinked Particles

The adhesive composition may further comprise acrylic crosslinked nanoparticles. The acrylic crosslinked nanoparticles may be mixed with core-shell rubber particles to be uniformly dispersed in a matrix resin, and contribute to improving impact resistance due to high-specific surface area.

In one example, the acrylate-based crosslinked particles may comprise a polymer of an alkyl (meth)acrylate, or a copolymer of an alkyl (meth)acrylate and a heterogeneous monomer. In one example, as the heterogeneous monomer, a vinyl-based monomer having an alkylene oxide group or a polyfunctional acrylate monomer can be used. When the crosslinked particles comprise a copolymer of an alkyl (meth)acrylate and a heterogeneous monomer, the copolymer may comprise 80 to 95 parts by weight of an alkyl (meth)acrylate-derived unit.

In one example, the crosslinked particles may comprise an alkyl (meth)acrylate unit and a polyfunctional acrylate monomer unit. In this case, the acrylic resin may be crosslinked by the polyfunctional monomer.

In one example, as the polyfunctional acrylate monomer, trimethylolpropane tri(meth)acrylate, ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth)acrylate, pentaerythritol tetra(meth)acrylate, 1,3-butylene di(meth)acrylate, allyl (meth)acrylate, and the like can be used.

In one example, the acrylic crosslinked particles may have an average particle diameter in a range of 10 nm to 200 nm. In the present application, the "particle diameter" may be used to mean a diameter of a particle that is spherical or ellipsoidal, and may mean the length of the longest dimension when the particle shape is not completely spherical or ellipsoidal. The 'average' means the diameter of the particle with 50% of the cumulative weight in the particle size distribution curve for the relevant particles. The particle diameter-related features may be measured using known equipment, and for example, dynamic lighting scattering or laser diffraction equipment and the like may be used to identify the particle diameter-related features. In the case of having the average particle diameter as above, the impact strength can be improved even with a relatively small amount without deteriorating other physical properties. Unless specifically defined, the particle diameter of the particles or particle size of the particles may be used in the sense of the average particle diameter to be described below.

In one example, the acrylic crosslinked particles may be included in an amount of 15 parts by weight or less relative to the total content of the adhesive composition. Specifically, the acrylic crosslinked particles may be included in an amount of 14 parts by weight, 13 parts by weight, 12 parts by weight, 11 parts by weight, or 10 parts by weight or less, relative to the total content of the adhesive composition. Although not particularly limited, the acrylic crosslinked particles may be included in an amount of 1 part by weight or more, 2 parts by weight or more, 3 parts by weight or more, 4 parts by weight or more, or 5 parts by weight or more.

(c) Rubber

The adhesive composition comprises a core-shell rubber in the form of secondary particles in which two or more core-shell rubbers in the form of primary particles are aggregated.

In the present application, the "core-shell rubber" may mean a particulate (solid) material having a rubber component in a core portion and having a structure in which a shell material is grafted or crosslinked to the core.

Then, in the present application, the "core-shell rubber in the form of primary particles" may mean each unit body having the core-shell structure, and the "core-shell rubber in the form of secondary particles" may mean an aggregate (or conglomerate) formed by clumping two or more core-shell rubbers (particles) in the form of primary particles together. The core-shell rubbers may be dispersed and present in the adhesive composition.

In one example, the core-shell rubber particles in the primary form and the core-shell rubber particles in the secondary form can be prepared according to the methods described in the following examples. In this case, the aggregated rubbers in the secondary form produced by a polymerization reaction can be separated into smaller aggregated rubbers through a kneader such as a planetary mixer. In one example, all of the aggregated particles may not be separated in the form of complete primary particles, and some of the secondary particles may be separated into primary particles and present in a mixed form of primary and secondary particles. For example, the weight ratio of the primary particles may be 50 wt % or less, 40 wt % or less, 30 wt % or less, 20 wt % or less, 10 wt % or less, 5 wt % or less, 4 wt % or less, 3 wt % or less, 2 wt % or less, 1 wt % or less, or 0.5 wt % or less, relative to the total content of the core-shell rubbers. In one example, the weight ratio of the primary particles may be substantially 0 wt %. Alternatively, the weight ratio of the primary particles may be, for example, 0.01 wt % or more, 0.1 wt % or more, or 1 wt % or more.

In another example, the core-shell rubber particles in the primary form and the core-shell rubber particles in the secondary form may be prepared through a separate process.

The core may comprise a polymer of a diene-based monomer, or may comprise a copolymer of a diene-based monomer and a heterogeneous monomer component (not diene-based). Although not particularly limited, for example, butadiene or isoprene may be used as the diene-based monomer.

In one example, the core may be a butadiene-based core. For example, the core may comprise a polymer of butadiene. In addition, the core may comprise a copolymer of butadiene and another ethylenically unsaturated monomer. The ethylenically unsaturated monomer used upon core formation can be exemplified by a vinyl-based aromatic monomer, (methy-l)acrylonitrile, an alkyl (meth)acrylate, and the like, but is not particularly limited thereto.

In one example, when the alkyl (meth)acrylate is additionally used in core formation, a different kind of alkyl (meth)acrylate from an alkyl (meth)acrylate used for shell formation, which is described below, can be used in the core.

The shell grafted or crosslinked to the core may comprise an alkyl (meth)acrylate unit. The fact that the shell comprises an alkyl (meth)acrylate unit means that an alkyl (meth)acrylate monomer can be used upon forming a shell polymer that is crosslinked or grafted to the core. In one example, as the alkyl (meth)acrylate, a lower alkyl (meth)acrylate having an alkyl group having 1 to 6 carbon atoms, such as methyl methacrylate, ethyl methacrylate or t-butyl methacrylate can be used, without being limited to the above-listed monomers.

The shell may further comprise a vinylidene-based monomer unit. For example, it may further comprise a unit of an aromatic vinyl monomer such as styrene, vinyl acetate or vinyl chloride. Although not particularly limited, in one example, the shell may comprise an alkyl (meth)acrylate unit and an aromatic vinyl monomer unit.

In one example, the core and shell may have a predetermined glass transition temperature (Tg). For example, the glass transition temperature (Tg) lower limit of the core may be −60° C. or more, −50° C. or more, or −40° C. or more. Although not particularly limited, the glass transition temperature upper limit of the core may be −20° C. or less, −25° C. or less, −30° C. or less, or −35° C. or less. In addition, the shell may have, for example, a glass transition temperature (Tg) of 50° C. or more, 60° C. or more, or 70° C. or more. Although not particularly limited, the glass transition temperature upper limit of the shell may be 120° C. or less. The glass transition temperature can be measured according to a known method, and for example, can be measured using differential scanning calorimetry (DSC).

In one example, the core-shell rubber in the form of primary particles may have a ratio of the core particle diameter to the total core-shell particle diameter (=thickness ratio of the core in the core-shell, R) of 0.80 or more.

In the present application, the "particle diameter" may be used to mean a diameter of a particle-shaped (for example, spherical or ellipsoidal) core-shell rubber or the configuration thereof, and may mean the length of the longest dimension when the shape of the core-shell rubber is not completely spherical or ellipsoidal. The particle diameter-related features may be measured using known equipment, and for example, dynamic lighting scattering or laser diffraction equipment and the like may be used to identify the particle diameter-related features. Unless specifically defined, the particle diameter of the particles or particle size of the particles may be used in the sense of the average particle diameter to be described below.

For example, the ratio of the core particle diameter to the total core-shell particle diameter may be 0.81 or more, 0.82 or more, 0.83 or more, 0.84 or more, 0.85 or more, 0.86 or more, 0.87 or more, 0.88 or more, 0.89 or more, or 0.90 or more. The upper limit of the ratio may be, for example, 0.99, and specifically, may be 0.98 or less, 0.97 or less, 0.96 or less, 0.95 or less, 0.94 or less, 0.93 or less, or 0.92 or less. In the case of commercialized core-shell products, they do not satisfy the above range in many cases, so that the impact absorption function by the rubber is not sufficient, but the core-shell rubber satisfying the above range can sufficiently absorb the impact applied to the structure. In particular, when the ratio of the core exceeds 0.99, it becomes difficult for the shell to surround the core part while the thickness of the shell becomes thin, whereby a decrease in compatibility with the epoxy resin or a decrease in dispersibility may occur. In addition, when the ratio of the core is less than 0.8, the effect of improving the impact strength is insufficient.

For example, when the core-shell rubber in the form of primary particles has an average particle diameter of 250 nm or more, 260 nm or more, 270 nm or more, 280 nm or more, 290 nm or more, or 300 nm or more, and for example, the upper limit thereof is 600 nm or less or 500 nm or less, specifically, 450 nm or less, 440 nm or less, 430 nm or less, 420 nm or less, 410 nm or less, or 400 nm or less, the core-shell rubber in the form of primary particles may have a size that can satisfy the above ratio (R). At this time, the 'average particle diameter" means the diameter that the particle with 50% of the cumulative weight (mass) in the particle size distribution curve has (passes). For example, the core of the core-shell rubber in the form of primary particles may have an average particle diameter of 180 nm or more, 200 nm or more, 220 nm or more, 240 nm or more, 260 nm or more, 280 nm or more, 300 nm or more, and the upper limit thereof may be, for example, 500 nm or less, 495 nm or less, 490 nm or less, specifically, 450 nm or less, 400 nm or 350 nm or less. In the case of commercialized core-shell products, the size and ratio (R) of the corresponding particle diameter do not satisfy the above range in many cases, so that the impact absorption function by the rubber is not sufficient.

In another example, the core-shell rubber in the form of primary particles may have an average particle diameter of 250 nm or less. In this case, the lower limit thereof may be, for example, 10 nm or more, 20 nm or more, or 30 nm or more. Even in the case of having such a particle diameter, the core-shell rubber in the form of primary particles may have the ratio (R) of the core particle diameter to the total core-shell particle diameter satisfying the above range. In the case of commercialized core-shell products, the size of the corresponding particle diameter does not satisfy the above range in many cases, so that the impact absorption function by the rubber is not sufficient.

Also, in the present application, the core-shell rubber may have a predetermined particle size distribution.

In one example, the core-shell rubber in the form of primary particles may have a diameter of $D_{10}$ in the particle diameter distribution, that is, a diameter up to cumulative 10% particles on the basis of weight (mass), from the smaller side of the particle diameters by the particle size distribution measurement, in a range of 180 to 220 nm.

In another example, the core-shell rubber in the form of primary particles may have a diameter of $D_{50}$ in the particle diameter distribution, that is, a diameter up to cumulative 50% particles on the basis of weight (mass), from the smaller side of the particle diameters by the particle size distribution measurement, in a range of 250 to 350 nm.

In another example, the core-shell rubber in the form of primary particles may have a diameter of $D_{90}$ in the particle diameter distribution, that is, a diameter up to cumulative 90% particles on the basis of weight (mass), from the smaller side of the particle diameters by the particle size distribution measurement, in a range of 450 to 510 nm.

In one example, the core-shell rubber in the form of primary particles may have a particle size distribution width of 2.0 or less or 1.5 or less obtained by the following equation 1. The lower limit thereof is not particularly limited, which may be, for example, 0.5 or more, 0.6 or more, 0.7 or more, 0.8 or more, 0.9 or more, or 1.0 or more.

$$(D_{90}-D_{10})/(D_{50})$$ [Equation 1]

As described above, when the core-shell rubber having a narrow particle size distribution width is used, it is advantageous to uniformly secure excellent adhesion strength, peel strength, and impact-resistant strength in a wide temperature range.

Such particle diameter characteristics can be obtained through, for example, a method of appropriately adjusting the type or content of monomers used upon core or shell formation, or a method of dividing the monomers into several stages to be introduced or appropriately adjusting the polymerization time of the core or shell or other polymerization conditions, and the like.

In one example, the number of primary particles aggregated for secondary particle formation is not particularly limited. For example, the primary particles may be aggregated to form secondary particles, so that the core-shell rubber conglomerate (aggregate), that is, the secondary particles may have a diameter in a range of 0.1 to 10 μm. In one example, the core-shell rubber (aggregated particles) in the form of secondary particles, which has undergone a kneading process through a kneader such as a planetary mixer after polymerization, may have a size of 2 μm or less, 1.5 μm or less, 1 μm or less, or 0.5 μm or less. In relation to the secondary particles, the size may be used in the sense corresponding to the particle diameter or the size of the longest dimension as described above.

In one example, the average particle diameter of the core-shell rubber in the form of secondary particles may be 1.5 μm or less, or 1 μm or less. Specifically, the average particle diameter of the core-shell rubber may be 900 nm or less, 800 nm or less, 700 nm or less, or 600 nm or less. Although not particularly limited, the average particle diameter lower limit of the core-shell rubber in the form of secondary particles may be 100 nm or more, 200 nm or more, 300 nm or more, 400 nm or more, or 500 nm or more.

The core-shell rubber in the form of secondary particles satisfying the above-described characteristics may be included in an amount of 5 parts by weight or more based on the total content of the adhesive composition. Specifically, the lower limit of the content may be 6 parts by weight or more, 7 parts by weight or more, 8 parts by weight or more, 9 parts by weight or more, or 10 parts by weight or more. In addition, the content of the core-shell rubber conglomerate may be 35 parts by weight or less. Specifically, the upper limit of the content may be 34 parts by weight or less, 33 parts by weight or less, 32 parts by weight or less, 31 parts by weight or less, or 30 parts by weight or less, and more specifically, may be 25 parts by weight or less, or 20 parts by weight or less. When it is used less than the content, the impact strength improvement effect is not sufficient, and when it is used in excess of the above range, it is not preferable because shear strength and high-temperature impact strength may be lowered.

In one example, the adhesive composition may further comprise a liquid rubber.

In one example, the liquid rubber may be a configuration having an epoxy group at the end of the liquid rubber, which is a homopolymer of a diene-based monomer or a copolymer of a diene-based monomer and a heterogeneous monomer. That is, the liquid rubber may be an epoxy terminated liquid rubber.

For example, the liquid rubber may comprise a homopolymer or copolymer having repeating units derived from butadiene or isobutadiene. In the liquid rubber, for example, a copolymer of butadiene or isobutadiene and an acrylate and/or an acrylonitrile may be included.

In one example, the content of the liquid rubber may be the same as that of the above-described core-shell rubber.

In one example, the adhesive composition may comprise at least 5 parts by weight or 10 parts by weight or more of a rubber (core-shell rubber and/or liquid rubber) based on the total content of the adhesive composition. For example, when the adhesive composition comprises only the core-shell rubber, the adhesive composition may comprise at least 5 parts by weight or 10 parts by weight or more of the core-shell rubber based on the total content of the adhesive composition. Alternatively, when the adhesive composition comprises both the core-shell rubber and the liquid rubber, the adhesive composition may comprise at least 5 parts by weight or 10 parts by weight or more of the core-shell rubber and the liquid rubber based on the total content of the adhesive composition. Even in such a case, the rubber components may be used in an amount of 35 parts by weight or less, in consideration of shear strength and high-temperature impact strength. In one example, the adhesive composition may comprise a rubber (core-shell rubber and/or liquid rubber) in an amount of 10 parts by weight or more, 12 parts by weight or more, or 14 parts by weight or more, and 30 parts by weight or less, 25 parts by weight or less, or 22 parts by weight or less, based on the total content of the adhesive composition.

(d) Epoxy Curing Agent

The adhesive composition may comprise a predetermined curing agent so that it can be cured at a temperature of about 80° C. or more, or about 100° C. or more. If the curing can occur in the above temperature range, the type of the curing agent is not particularly limited. For example, as the curing agent, a dicyandiamide, a melamine, a diallyl melamine, a guanamine (e.g. acetoguanamine, benzoguanamine), an aminotriazole (3-amino-1,2,4-triazole), a hydrazide (adipic acid dihydride, stearic acid dihydrazide, isophthalic acid dihydrazide), a cyanoacetamide or an aromatic polyamine (e.g.: diaminodiphenylsulfone), and the like can be used.

Although not particularly limited, the curing agent may be used in an amount of, for example, 1 part by weight or more, 2 parts by weight or more, 3 parts by weight or more, or 4 parts by weight or more, based on the total content of the adhesive composition. Although not particularly limited, the content upper limit of the curing agent may be 15 parts by weight or less, 14 parts by weight or less, 13 parts by weight or less, 12 parts by weight or less, 11 parts by weight or less, or 10 parts by weight or less.

(e) Urethane Resin

The urethane resin used in the present application may have a structure (capping structure) in which at least one of the isocyanate groups which are terminals of the urethane resin is terminated with a predetermined compound, as described below.

The urethane resin may contain an isocyanate unit and a polyether polyol unit. In the present application, the fact that the urethane resin comprises predetermined units may mean a state where in a resin structure (main chain or side chain) formed by reaction of one or more compounds, the compounds are polymerized and simultaneously the units derived therefrom are included in the resin structure.

The specific kind of isocyanate used in the urethane resin is not particularly limited, and a known aromatic or non-aromatic isocyanate may be used. In a non-limiting example, the isocyanate can be nonaromatic. That is, upon forming the modified urethane resin, an isocyanate of aliphatic or alicyclic series may be used. In the case of using the non-aromatic isocyanate, impact resistance, or viscosity characteristics of the adhesive composition may be improved.

The kind of the usable non-aromatic isocyanate is not particularly limited. For example, an aliphatic polyisocyanate or its modified products can be used. Specifically, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophorone diisocyanate, bis(isocyanatemethyl) cyclohexane diisocyanate or dicyclohexylmethane diisocyanate; or a carbodiimide-modified polyisocyanate or isocyanurate-modified polyisocyanate of at least one of the foregoing; and the like can be used. In addition, a mixture of two or more of the above-listed compounds can be used.

In one example, the polyol may be a polyol having an OH equivalent of 300 or more. For example, the OH equivalent lower limit of the polyol may be 400 or more, 500 or more, 600 or more, 700 or more, 800 or more, or 900 or more. The OH equivalent upper limit of the polyol is not particularly limited, but may be, for example, 2,000 or less, 1,900 or less, 1,800 or less, 1,700 or less, 1,600 or less, 1,500 or less, 1,400 or less, 1,300 or less, 1,200 or less, or 1,100 or less. When the equivalent range is satisfied, it is advantageous to improve impact-resistant characteristics, adhesion strength characteristics and peeling characteristics of the adhesive.

The kind of the polyol is not particularly limited as long as the equivalent is satisfied. For example, a tetrafunctional polyol such as pentaerythritol; a trifunctional polyol such as glycerin or trimethylolpropane; or a bifunctional polyol such as glycol may be used. In one example, a polyalkylene glycol may be used as the polyol, without being particularly limited thereto. Specifically, for example, polypropylene glycol may be used as the polyalkylene glycol.

In one example, the urethane resin may comprise a branched polyether polyol unit, and a non-aromatic isocyanate unit.

In one example, the polyol may be branched polypropylene glycol. The branched polypropylene means that the polypropylene backbone is configured to have side chains, which may be distinguished from the linear shape, that is, the case where the polypropylene repeating unit does not have side chains. For example, the branched polypropylene has branches in which a-olefins, such as ethylene, 1-butene, 1-hexene or 4-methyl-1-pentene, are incorporated (copolymerized) into the polypropylene backbone. That is, in one example of the present application, the polyol may have a branched polypropylene unit. When the branched polypropylene glycol is used, it is advantageous for strength improvement.

As mentioned above, the urethane resin may have a structure in which one or more of its isocyanate ends are terminated by a predetermined compound. The so-called capping method of the isocyanate end in the urethane resin is not particularly limited. Known techniques can be used. For example, a polymer or prepolymer, which is derived from an ether-based polyol, having urethane groups in urethane chains and having isocyanate groups at their ends is prepared, where the isocyanate ends of the urethane can be capped through a compound having an active hydrogen group at all or part of the isocyanate groups. In another example, upon preparing the urethane resin, a method of capping simultaneously with polymerization by introducing a compound capable of capping the isocyanate ends together may be used. The kind of the compound which is capable of capping isocyanate ends is not specifically limited, and for example, an amine-based compound, a phenol-based compound, an oxime-based compound, or a bisphenol-based compound can be used.

In one example, the urethane resin may have a weight average molecular weight (Mw) of 3,000 to 40,000. The weight average molecular weight may be a polystyrene conversion molecular weight measured by GPC. More specifically, the lower limit of the weight average molecular weight of the urethane resin may be 3,000 or more, 3,500 or more, 4,000 or more, 4,500 or more, 5,000 or more, 5,500 or more, 6,000 or more, 6,500 or more, 7,000 or more, 7,500 or more, 8,000 or more 8,500 or more, or 9,000 or more. Although not particularly limited, the upper limit of the weight average molecular weight of the urethane resin may be 35,000 or less, or 30,000 or less. When the above range is satisfied, it is possible to provide advantageous physical properties to the adhesive. The urethane resin may have a molecular weight controlled using a branching agent, a chain extender or the like upon its manufacture, and may also have a linear structure or a branched structure. In the case of the branched structure, it is appropriate to polymerize the urethane without using a chain extender, which is advantageous for obtaining an appropriate molecular weight. When polypropylene glycol is used as the polyol, the degree of contribution to improving the impact strength of the urethane resin having a branched structure may be higher.

In one example, the adhesive composition may comprise 5 parts by weight or more of the modified urethane resin based on the content of the entire adhesive composition. Specifically, the content of the modified urethane resin may be 6 parts by weight or more, 7 parts by weight or more, 8 parts by weight or more, 9 parts by weight or more, or 10 parts by weight or more. Although not particularly limited, the content upper limit of the urethane resin may be, for example, 25 parts by weight or less. More specifically, the urethane resin may be used in an amount of 20 parts by weight or less, 19 parts by weight or less, 18 parts by weight or less, 17 parts by weight or less, 16 parts by weight or less, or 15 parts by weight or less. When the urethane resin is used in an amount of less than the above range, the impact strength improvement is not sufficient, and when it is used in an amount of more than the above range, there is a problem that shear strength is lowered and high-temperature impact strength is lowered.

(f) Other Components

The adhesive composition may comprise a catalyst to control the rate and temperature of the curing reaction by the curing agent. The type of the catalyst is not particularly limited, and various kinds of known catalysts may be appropriately used.

In one non-limiting example, as the catalyst, urea series such as p-chlorophenyl-N,N-dimethylurea, 3-phenyl-1,1-dimethylurea or 3,4-dichlorophenyl-N,N-dimethylurea; tertiary acrylics; amines such as benzyldimethylamine; piperidine or derivatives thereof; or imidazole derivatives may be used.

Although not particularly limited, the catalyst may be used, for example, in an amount of 0.1 parts by weight or more, 0.2 parts by weight or more, 0.3 parts by weight or more, or 0.4 parts by weight or more, based on the total content of the adhesive composition. Although not particularly limited, the upper limit of the catalyst content may be 2 parts by weight or less.

In one example, the adhesive composition may further comprise a particulate inorganic filler, that is, inorganic particles. When the inorganic filler is used, it is possible to adjust the mechanical properties, rheological properties and the like of the adhesive. The form of the inorganic filler may be rectangular, spherical, platy or acicular, which is not particularly limited.

As the inorganic filler, for example, calcium oxide, quartz powder, alumina, calcium carbonate, calcium oxide, aluminum hydroxide, magnesium calcium carbonate, barite, hydrophilic or hydrophobic silica particles, or aluminum magnesium calcium silicate can be used. When silica particles are used, it is more preferable that they have hydrophobicity.

Although not particularly limited, the inorganic filler may be used in an amount of, for example, 1 part by weight or more, 2 parts by weight or more, 3 parts by weight or more, or 4 parts by weight or more, based on the total content of the adhesive composition. Although not particularly limited, the upper limit of the inorganic filler content may be 15 parts by weight or less, or 10 parts by weight or less.

In one example, the composition may further comprise various kinds of additives. For example, known plasticizers, reactive or non-reactive diluents, coupling agents, fluidity modifiers, thixotropic agents, colorants, and the like may further be included in the adhesive composition. The specific kind of the additive is not particularly limited, and known materials or commercial products may be used without limitation.

Although not particularly limited, the additive may be used in an amount of, for example, 0.1 parts by weight or more, 1 part by weight or more, 2 parts by weight or more, or 3 parts by weight or more, based on the total content of the adhesive composition. Although not particularly limited, the upper limit of the additive content may be 15 parts by weight or less, 14 parts by weight or less, 13 parts by weight or less, 12 parts by weight or less, 11 parts by weight or less, or 10 parts by weight or less.

In another example of the present application, the present application relates to a structure comprising a cured product of the adhesive composition. The structure may comprise a base material and a cured product of the adhesive composition cured after being applied on the base material. The base material may comprise a metal component, a plastic component, wood, a glass fiber-containing base material, and the like.

In one example, the structure may have a form in which two or more base materials are bonded via the cured product. For example, the structure may have a form in which a metal and a metal are bonded via the cured product, a form in which a metal and a plastic are bonded via the cured product, or a form in which a plastic and a plastic are bonded via the cured product. The structure can be used as a structural material for aerospace, wind power generation, ships or automobiles.

In another example of the present application, the present application relates to a method for producing a structure. The method may comprise steps of applying a composition having a configuration as described above on a surface of a base material and curing the composition applied to the surface of the base material. The application may be performed such that physical contact between the base material and the adhesive composition occurs.

The method of applying the adhesive composition to the surface of the structure is not particularly limited. For example, jet spraying methods such as swirl or streaming, or mechanical application by an extrusion method can be used. The application may be made to one or more base materials to be bonded.

The curing temperature is not particularly limited. For example, the curing may be performed at 80° C. or more, or 100° C. or more. Although not particularly limited, considering heat-resistant stability, it is preferable to perform the curing at a temperature of 220° C. or less.

Advantageous Effects

According to one example of the present application, an adhesive composition providing excellent adhesion strength, peel strength and impact-resistant strength uniformly over a wide temperature range can be provided.

BRIEF DESCRIPTION OF DRAWINGS

FIG. 1 shows the particle size distribution of the core-shell rubbers (in the form of primary particles) prepared according to one embodiment of the present application. The horizontal axis means particle diameters, and the vertical axis means relative numbers of rubbers.

FIG. 2 is an image taken to the appearance that the core-shell rubbers prepared according to one embodiment of the present application are dispersed in an epoxy resin.

DETAILED DESCRIPTION

Hereinafter, the present application will be described through examples and comparative examples. However, the scope of the present application is not limited by the scope set forth below.

PRODUCTION EXAMPLES

Production Example 1: Production of Core-Shell Rubber Assembly

First step (production of core): 70 parts by weight of ion-exchanged water, 60 parts by weight of 1,3-butadiene as a monomer, 1.0 part by weight of sodium dodecylbenzene sulfonate as an emulsifier, 0.85 parts by weight of calcium carbonate, 0.28 parts by weight of tertiary dodecyl mercaptan and 0.28 parts by weight of persulfate potassium as an initiator were introduced into a nitrogen-substituted polymerization reactor, and reacted at 75° C. until a polymerization conversion ratio was 30 to 40%. Thereafter, 0.3 parts by weight of sodium dodecylbenzene sulfonate was introduced thereto, 20 parts by weight of 1,3-butadiene was further introduced thereto, and the temperature was raised to 80° C. to terminate the reaction at the time when the polymerization conversion ratio was 95%. The produced polymer had a latex gel content of 73%. At this time, the rubber latex was coagulated with a dilute acid or a metal salt, and then washed, dried in a vacuum oven at 60° C. for 24 hours, and 1 g of the resulting rubber was placed in 100 g of toluene and stored in a dark room at room temperature for 48 hours, and then the latex gel content was measured by separating the sol and the gel.

Second step: 70 parts by weight of the produced rubber latex was put into a closed reactor, and the temperature of the reactor filled with nitrogen was raised to 75° C. Thereafter, 0.1 parts by weight of sodium pyrophosphate, 0.2 parts by weight of dextrose and 0.002 parts by weight of ferrous sulfide were introduced into the reactor in a lump.

In a separate mixing device, 25.5 parts by weight of methyl methacrylate, 4.5 parts by weight of styrene, 0.5 parts by weight of sodium dodecylbenzene sulfonate as an emulsifier, 0.1 parts by weight of cumene hydroperoxide and 20 parts by weight of ion-exchanged water were mixed to prepare a monomer emulsion.

To the reactor to which the rubber latex had been introduced, the emulsion was continuously added over 3 hours, and then, after 30 minutes, 0.03 parts by weight of hydroperoxide was added and aged at the same temperature for 1 hour to terminate the reaction at the time when the polymerization conversion ratio was 98%.

At an appropriate time in the process, the average particle diameter of the core measured by Nicomp N300 dynamic light scattering equipment was 320 nm, and the average particle diameter of the core-shell rubber resin latex was 345 nm.

In addition, the particle size distribution of the produced core-shell rubber in the form of primary particles was measured, and the results were described in FIG. 1.

Thereafter, an antioxidant was added to the reactant, aggregated with magnesium sulfate, and then dehydrated and dried to produce a core-shell rubber in an aggregated form.

Production Example 2: Production of Acrylic Crosslinked Particles 86 parts by weight of methyl methacrylate, 9 parts by weight of butyl acrylate and 5 parts by weight of ethylene glycol dimethacrylate were introduced, 0.025 parts by weight of ethylenediaminetetrasodium acetate, 0.003 parts by weight of ferrous sulfate, 0.1 parts by weight of sodium formaldehyde sulfoxylate, 1 part by weight of sodium lauryl sulfate, 2.5 parts by weight of alkenylsuccinic acid salt, 160 parts by weight of ion-exchanged water and 0.2 parts by weight of t-butyl hydroperoxide were introduced, and then reacted at 65° C. for 6 hours to obtain acrylic crosslinked nanoparticles having an average particle size of 60 nm.

Production Example 3: Production of Modified Urethane Resin 67 g of branched polypropylene glycol having an OH equivalent of 1,000, 22.3 g of isophorone diisocyanate and 13.4 g of allylphenol and 0.1 g of a tin catalyst were mixed in a nitrogen-substituted polymerization reactor, and the reaction was performed at 75° C. to produce a modified urethane resin.

Production Example 4: Production of Structural Adhesive

The compositions of Examples and Comparative Examples containing the components shown in Table 1 below in predetermined contents (weight ratio: parts by weight) were prepared as adhesive materials. Specifically, the core-shell rubber conglomerates and the epoxy resins were placed in a planetary mixer and mixed at 80° C. for 5 hours. The appearance that the core-shell rubbers are dispersed in the epoxy resin is as shown in FIG. 2. Thereafter, the remaining components excluding 'the urethane resin, the curing agent and the catalyst' were placed in the planetary mixer and stirred at 80° C. for 3 hours. Finally, the temperature was lowered to 40° C., 'the urethane resin, the curing agent and the catalyst' were put in the planetary mixer and mixed for 1 hour, and then the temperature was lowered to room temperature (about 23° C.) to terminate the kneading.

Method of Measuring Physical Properties
Impact Peel Strength

Five specimens were manufactured for each of Examples and Comparative Examples, and an object weighing 45 kg was dropped freely at a rate of 2 m/s at a height of 1.5 m in accordance with DIN ISO 11343, and the impact peel strength (unit: N/mm) was measured at each of 80° C., 23° C. and −40° C. and the average value was taken.

In the case of the specimen, two cold rolled steel having a size of 90 mm×25 mm×1.6 mm (length×width×thickness) and a strength of 440 MPa were prepared, and the adhesive was applied to a predetermined area of the cold rolled steel so that the adhesive area of the cold rolled steel was 25 mm×30 mm, and cured at 180° C. for 20 minutes. Using glass beads, the thickness of the adhesive layer was kept uniform at 0.2 mm. The measurement results were described in Table 2.

Shear Strength Experiment

For the specimens prepared in connection with Examples and Comparative Examples, five shear strength measurements were performed in accordance with DIN EN 1465 and the average value was taken. At this time, the shear strength (unit: Mpa) measurement was made under conditions of 10 mm/min and 23° C.

In the case of the specimen, two cold rolled steel sheets having a size of 100 mm×25 mm×1.6 mm (length×width×thickness) and a strength of 440 MPa were prepared, and the adhesive was applied to a predetermined area of the cold rolled steel so that the adhesive area of the cold rolled steel was 25 mm×10 mm, and cured at 180° C. for 20 minutes. Using glass beads, the thickness of the adhesive layer was kept uniform at 0.2 mm. The measurement results were described in Table 2.

Experiment Results

TABLE 1

|  | Example | Comparative Example | | | |
|---|---|---|---|---|---|
|  | 1 | 1 | 2 | 3 | 4 |
| First epoxy resin[1] | 20 | 20 | 20 | 28 | 20 |
| Second epoxy resin[2] | 5 | 5 | 15 | 2 | 5 |
| Third epoxy resin[3] | 27 | 27 | 27 | 27 | 27 |
| Core-shell rubber [4] | 12 | — | — | 12 | 12 |
| Core-shell rubber[5] | — | 12 | 12 | — | — |
| Acrylic particle[6] | 5 | 5 | 5 | — | 5 |
| Urethane resin[7] | 10 | 10 | — | 10 | — |
| Urethane resin[8] | — | — | — | — | 10 |
| Mono epoxy resin[9] | 1 | 1 | 1 | 1 | 1 |
| Colorant[10] | 0.05 | 0.05 | 0.05 | 0.05 | 0.05 |
| Curing agent[11] | 5.6 | 5.6 | 5.6 | 5.6 | 5.6 |
| Catalyst[12] | 1 | 1 | 1 | 1 | 1 |
| CaCO3 | 10 | 10 | 10 | 10 | 10 |
| Wollastonite | 1 | 1 | 1 | 1 | 1 |
| Fumed silica[13] | 2 | 2 | 2 | 2 | 2 |
| Silane coupling agent[14] | 0.35 | 0.35 | 0.35 | 0.35 | 0.35 |

1. First epoxy resin[1]: Bisphenol A-based epoxy resin (YD-128) having an epoxy equivalent of 200 or less
2. Second epoxy resin[2]: Bisphenol A-based epoxy resin (YD-011) having an epoxy equivalent of 300 or more
3. Third epoxy resin[3]: Bisphenol F-based epoxy resin (YD-170) having an epoxy equivalent of 200 or less
4. Core-shell rubber [4]: Core-shell rubber of Production Example 1
5. Core-shell rubber[5]: Paralloid EXL 2600 from DOW
6. Acrylic particle[6]: Acrylic crosslinked particle of Production Example 2
7. Urethane resin[7]: Urethane resin of Production Example 3
8. Urethane resin[8]: Huntzman DY965
9. Mono epoxy resin[9]: NC513 from Cardolite
10. Colorant[10]: Pigment violet 23
11: Curing agent[11]: Airproduct 1200G
12: Catalyst[12]: Evonik Amicure UR7/10
13: Fumed silica[13]: Cabo TS720
14: Silane coupling agent[14]: GE Advanced material A-187

TABLE 2

|  | Example 1 | Comparative Example | | | |
|---|---|---|---|---|---|
|  |  | 1 | 2 | 3 | 4 |
| Impact strength (−40° C.) | 28 | 5 | X | 15 | 4 |
| Impact strength (23° C.) | 39 | 34 | 28 | 36 | 32 |
| Impact strength (80° C.) | 38 | 31 | 29 | 33 | 32 |
| Shear strength (23° C.) | 33 | 32 | 33 | 30 | 30 |

X: the case where the stably measured value is not obtained because the measured value is very low

The invention claimed is:

1. An adhesive composition comprising:
   (a) an epoxy resins;
   (b) acrylic crosslinked particles comprising an alkyl (meth)acrylate unit and a polyfunctional acrylate unit, wherein the polyfunctional acrylate unit is ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth)acrylate, pentaerythritol tetra(meth)acrylate, or a mixture thereof;
   (c) a core-shell rubber in the form of secondary particles, wherein the secondary particles comprise two or more core-shell rubbers in the form of primary particles which are aggregated;
   (d) one or more epoxy curing agents; and
   (e) a urethane resin having a polyether structure.

2. The adhesive composition according to claim 1, wherein the epoxy resin is selected from a bisphenol A-based epoxy resin or a bisphenol F-based resin.

3. The adhesive composition according to claim 2, wherein the epoxy resin comprises at least one epoxy resin having a first epoxy equivalent of less than 300 and another epoxy resin having a second epoxy equivalent of 300 or more.

4. The adhesive composition according to claim 3, wherein the adhesive composition comprises 15 parts by weight or more of the epoxy resins relative to 100 parts by weight of the adhesive composition.

5. The adhesive composition according to claim 1, wherein the acrylic crosslinked particles (b) have an average particle diameter in a range of 10 nm to 200 nm.

6. The adhesive composition according to claim 1, wherein the two or more core-shell rubbers in the form of primary particles have an average particle diameter of 250 nm to 500 nm.

7. The adhesive composition according to claim 1, wherein cores in the two or more core-shell rubbers in the form of primary particles have an average particle diameter of 180 to 495 nm.

8. The adhesive composition according to claim 7, wherein the two or more core-shell rubbers in the form of primary particles have a ratio of a core particle diameter to a total particle diameter of core-shell particles satisfying 0.8 to 0.99.

9. The adhesive composition according to claim 1, wherein the core-shell rubber has butadiene-based cores.

10. The adhesive composition according to claim 1, wherein the adhesive composition comprises 5 to 35 parts by weight of the core-shell rubber in the form of secondary particles (c) based on 100 parts by weight of the adhesive composition.

11. The adhesive composition according to claim 1, wherein the urethane resin (e) having the polyether structure comprises a branched polyether polyol unit and a non-aromatic isocyanate unit.

12. The adhesive composition according to claim 11, wherein the urethane resin (e) has at least one of isocyanate ends terminated with an amine-based compound, a phenol-based compound, an oxime-based compound, or a bisphenol-based compound.

13. The adhesive composition according to claim 11, wherein the polyether polyol unit has an OH equivalent in a range of 300 to 2,000.

14. The adhesive composition according to claim 13, wherein the polyether polyol unit has an OH equivalent in the range of 400 to 1,100.

15. The adhesive composition according to claim 11, wherein the polyether polyol unit is branched polypropylene glycol.

16. The adhesive composition according to claim 1, wherein the urethane resin (e) is included in a range of 5 to 25 parts by weight based on 100 parts by weight of the adhesive composition.

17. A structure comprising a cured product of the adhesive composition according to claim 1; and a base material in contact with the cured product.

18. A method for producing a structure comprising:
applying the adhesive composition according to claim 1 to a surface of a base material; and
curing the adhesive composition applied to the surface of the base material.

* * * * *